(12) United States Patent
Love et al.

(10) Patent No.: US 7,986,588 B2
(45) Date of Patent: Jul. 26, 2011

(54) METHOD FOR SELECTIVE BANDLIMITED DATA ACQUISITION IN SUBSURFACE FORMATIONS

(75) Inventors: Jeff L. Love, Georgetown, TX (US); Charles Puryear, Houston, TX (US)

(73) Assignee: Seispec, L.L.C., Georgetown, TX (US)

( * ) Notice: Subject to any disclaimer, the term of this patent is extended or adjusted under 35 U.S.C. 154(b) by 0 days.

(21) Appl. No.: 12/502,169

(22) Filed: Jul. 13, 2009

(65) Prior Publication Data
US 2009/0310442 A1 Dec. 17, 2009

Related U.S. Application Data

(63) Continuation of application No. 12/048,722, filed on Mar. 14, 2008, now Pat. No. 7,599,251, which is a continuation of application No. 11/451,571, filed on Jun. 13, 2006, now Pat. No. 7,382,684.

(51) Int. Cl.
*G01V 1/00* (2006.01)
(52) U.S. Cl. ............................ 367/49; 367/35; 367/32
(58) Field of Classification Search .............. 367/25, 367/28, 32, 34, 37–40, 49, 140
See application file for complete search history.

(56) References Cited

U.S. PATENT DOCUMENTS

| | | | |
|---|---|---|---|
| 2,700,753 A | 1/1955 | Peterson | |
| 3,416,632 A | 12/1968 | Bodine, Jr. | |
| 3,504,756 A | 4/1970 | Anstey et al. | |
| 3,885,225 A | 5/1975 | Anstey et al. | |
| 4,014,403 A | 3/1977 | Mifsud | |
| 4,049,077 A | 9/1977 | Mifsud | |
| 4,282,588 A | 8/1981 | Chanson et al. | |
| 4,365,322 A | 12/1982 | Widrow | |
| 4,410,062 A | 10/1983 | Mifsud | |
| 4,458,340 A * | 7/1984 | Lautzenhiser | 367/32 |
| 4,483,411 A | 11/1984 | Mifsud | |
| 4,505,362 A | 3/1985 | Layotte et al. | |
| 4,525,645 A | 6/1985 | Shirley et al. | |
| 4,578,784 A | 3/1986 | Mifsud | |
| 4,651,044 A | 3/1987 | Kompanek | |
| 4,671,379 A | 6/1987 | Kennedy et al. | |
| 4,674,591 A | 6/1987 | Vogen | |
| 4,685,091 A | 8/1987 | Chung et al. | |
| 4,702,343 A | 10/1987 | Paulsson | |
| 4,834,210 A | 5/1989 | Kennedy | |

(Continued)

FOREIGN PATENT DOCUMENTS

MX 277671 7/2010

(Continued)

OTHER PUBLICATIONS

Notice of Allowance for U.S. Appl. No. 12/048,722, mail date Jun. 25, 2009, 8 pages.

(Continued)

*Primary Examiner* — Jack Keith
*Assistant Examiner* — Krystine Breier
(74) *Attorney, Agent, or Firm* — Foley & Lardner LLP (57) ABSTRACT

The method for exploring desired characteristics of a subsurface sector, having at least one resonant frequency, is based on selectively transmitting suitable narrowband energy waves into the subsurface sector, thereby producing narrowband signals reflected off the subsurface sector. The transmitted narrowband energy waves can be selectively and optimally adjusted in real time so as to provide optimum illumination of the desired characteristics from the explored sector.

7 Claims, 10 Drawing Sheets

U.S. PATENT DOCUMENTS

| | | | |
|---|---|---|---|
| 4,862,990 A | 9/1989 | Cole | |
| 4,932,003 A | 6/1990 | Winbow et al. | |
| 5,031,719 A | 7/1991 | Baria et al. | |
| 5,036,945 A | 8/1991 | Hoyle et al. | |
| 5,077,697 A | 12/1991 | Chang | |
| 5,079,751 A | 1/1992 | Woodward | |
| 5,081,613 A | 1/1992 | Holzhausen et al. | |
| 5,093,811 A | 3/1992 | Mellor et al. | |
| 5,137,109 A | 8/1992 | Dorel | |
| 5,146,432 A | 9/1992 | Kimball et al. | |
| 5,228,011 A | 7/1993 | Owen | |
| 5,239,514 A | 8/1993 | Winbow et al. | |
| 5,317,330 A | 5/1994 | Everett et al. | |
| 5,357,063 A | 10/1994 | House et al. | |
| 5,387,767 A | 2/1995 | Aron et al. | |
| 5,414,674 A | 5/1995 | Lichman | |
| 5,418,335 A | 5/1995 | Winbow | |
| 5,563,846 A | 10/1996 | Fillon | |
| 5,584,159 A | 12/1996 | Presley | |
| 5,648,938 A | 7/1997 | Jakubowicz | |
| 5,662,165 A | 9/1997 | Tubel et al. | |
| 5,672,825 A | 9/1997 | Uno et al. | |
| 5,719,821 A | 2/1998 | Sallas et al. | |
| 5,721,710 A | 2/1998 | Sallas et al. | |
| 5,724,308 A | 3/1998 | Sorrells et al. | |
| 5,753,812 A | 5/1998 | Aron et al. | |
| 5,852,262 A | 12/1998 | Gill et al. | |
| 5,852,587 A | 12/1998 | Kostek et al. | |
| 5,974,881 A | 11/1999 | Donskoy et al. | |
| 6,002,640 A | 12/1999 | Harmon | |
| 6,065,538 A | 5/2000 | Reimers et al. | |
| 6,119,804 A | 9/2000 | Owen | |
| 6,131,071 A | 10/2000 | Partyka et al. | |
| 6,134,966 A | 10/2000 | Donskoy et al. | |
| 6,175,536 B1 | 1/2001 | Khan | |
| 6,181,642 B1 | 1/2001 | Coates et al. | |
| 6,193,010 B1 | 2/2001 | Minto | |
| 6,213,250 B1 | 4/2001 | Wisniewski et al. | |
| 6,366,531 B1 | 4/2002 | Varsamis et al. | |
| 6,394,221 B2 | 5/2002 | Cosma | |
| 6,467,542 B1 | 10/2002 | Kostrov et al. | |
| 6,488,117 B1 | 12/2002 | Owen | |
| 6,614,716 B2 | 9/2003 | Plona et al. | |
| 6,619,394 B2 | 9/2003 | Soliman et al. | |
| 6,661,737 B2 | 12/2003 | Wisniewski et al. | |
| 6,684,159 B2 * | 1/2004 | Khan et al. | |
| 6,747,914 B2 * | 6/2004 | Aronstam | |
| 6,777,684 B1 * | 8/2004 | Volkov et al. | |
| 6,788,619 B2 * | 9/2004 | Calvert | |
| 6,795,373 B1 * | 9/2004 | Aronstam | |
| 6,814,141 B2 * | 11/2004 | Huh et al. | |
| 6,866,098 B1 * | 3/2005 | Arndt et al. | |
| 6,909,666 B2 * | 6/2005 | Dubinsky et al. | |
| 6,928,030 B2 * | 8/2005 | Chamberlain et al. | |
| 6,943,697 B2 * | 9/2005 | Ciglenec et al. | |
| 6,957,700 B2 * | 10/2005 | Mandal | |
| 6,970,397 B2 * | 11/2005 | Castagna et al. | |
| 6,973,972 B2 * | 12/2005 | Aronstam | |
| 6,985,815 B2 * | 1/2006 | Castagna et al. | |
| 7,046,165 B2 * | 5/2006 | Beique et al. | |
| 7,099,810 B2 * | 8/2006 | Mandal | |
| 7,123,725 B2 * | 10/2006 | Boesch et al. | |
| 7,207,397 B2 * | 4/2007 | Miyamoto et al. | |
| 7,382,684 B2 | 6/2008 | Love et al. | |
| 7,599,251 B2 | 10/2009 | Love et al. | |
| 7,656,747 B2 * | 2/2010 | Mandal et al. | 367/35 |
| 2001/0011590 A1 | 8/2001 | Thomas et al. | |
| 2002/0070017 A1 | 6/2002 | Soliman et al. | |
| 2002/0148606 A1 | 10/2002 | Zheng et al. | |
| 2002/0179364 A1 | 12/2002 | Bussear et al. | |
| 2004/0105533 A1 | 6/2004 | Iseli | |
| 2005/0010366 A1 | 1/2005 | Castagna et al. | |
| 2005/0075790 A1 | 4/2005 | Taner | |
| 2005/0087391 A1 | 4/2005 | Ounadjela | |
| 2005/0193818 A1 | 9/2005 | Cobb | |
| 2005/0201203 A1 | 9/2005 | Goloshubin et al. | |

FOREIGN PATENT DOCUMENTS

| | | | |
|---|---|---|---|
| NG | C/2008/683 | | 1/2010 |
| OA | 14398 | | 9/2009 |
| WO | WO 99/46478 | * | 9/1999 |
| WO | WO 2005/103766 | * | 11/2005 |
| ZA | 2008/10313 | | 11/2009 |

OTHER PUBLICATIONS

Hardage, Frequencies are fault finding factors: Looking Low Aids Data Interpretation, GeoPhysicalCorner, AAPG Explorer, Sep. 2009, 1 page.

Castagna et al., Instantaneous spectral analysis: Detection of low-frequency shadows associated with hydrocarbons, The Leading Edge, Feb. 2003, pp. 120-127.

Marfurt et al., Narrow-band spectral analysis and thin-bed tuning, Geophysics, vol. 66, No. 4, Jul.-Aug. 2001, pp. 1274-1283.

Fahmy et al., Successful Application of Spectral Decomposition Technology Toward Drilling of a Key Offshore Development Well, SEG/Houston 2005 Annual Meeting, pp. 262-265.

Partyka et al., Interpretational applications of spectral decomposition in reservoir characterization, The Leading Edge, Mar. 1999, pp. 353-360.

Balogh et al., New Piezoelectric Transducer for Hole-to-Hole Seismic Applications, 58th Annual International Meeting of the Society of Exploration Geophysics (1998), Session DEV2.5, pp. 155-157.

Kennedy et al., Swept-Frequency Borehole Source for Inverse VSP and Cross-Borehole Surveying, 7th Geophysical Conference of the Australian Society of Exploration Geophysics (1989), vol. 20, pp. 158-160.

Turpening et al., Imaging with reverse vertical seismic profiles using a downhole, hydraulic, axial vibrator, 62nd Meeting of EAGE (2000), Session P0161, 4 pages.

Ziolkowski et al., Determination of Tube-Wave to Body-Wave Ratio for Conoco Borehole Orbital Source, 69th Annual International Meeting of the Society of Exploration Geophysics (1999), pp. 156-159.

Owen et al., Arc Discharge Pulse Source for Borehole Seismic Applications, 58th Annual International Meeting of the Society of Exploration Geophysics (1988) Session DEV2.4; pp. 151-154.

Calvert, R., Insights And Methods for 4D Reservoir Monitoring And Characterization: 2005 Distinguished Instructor Short Course, 2005: Tulsa, Okla., entire book.

Kennedy, W. et al., A Swept-Frequency Borehole Source For Inverse VSP and Cross-Borehole Surveying, 7th Geophysical Conference of the Australian Society of Exploration Geophysics, vol. 20, pp. 133-136 (1989).

Burch, Sonic Logs Need Troubleshooting, printed from Internet address: http://www.aapg.org/explorer/geophyscial_corner/2002/03gpc.cfm, on Aug. 3, 2007, Mar. 2002 Explorer, 4 pages.

Burch, Log Ties Seismic to 'Ground Truth', printed from Internet address: http://www.aapg.org/explorer/geophysical_corner/2002/02gpc.cfmn, on Aug. 3, 2007, Feb. 2002 Explorer, 4 pages.

Brie et al., New Directions in Sonic Logging, Oilfield Review, Spring 1998, pp. 40-55.

Franco et al., Sonic Investigations In and Around the Borehole, Oilfield Review, Spring 2006, pp. 14-33.

Schlumberger, Isolation Scanner, May 2006, 2 pages.

Schlumberger, The Oilfield Glossary: printed from Internet address: http://www.glossary.oilfield.slb.com/search.cfm, on Aug. 17, 2007, definition of term 'acquisition', 2 pages.

Schlumberger, The Oilfield Glossary: Where Oil Field Meets the Dictionary, printed from Internet address: http://www.glossary.oilfield.slb.com, on Aug. 3, 2007, various definitions, 7 pages.

Schlumberger, The Oilfield Glossary, printed from Internet address: http://www.glossary.oilfield.slb.com/Display.cfm?Term=log, on Aug. 14 2007, definition of term 'log', 2 pages.

Schlumberger, The Oilfield Glossary, printed from Internet address: http://www.glossary.oilfield.slb.com/Display.cfm?Term=borehole%20seismic%20data, on Aug. 14, 2007, definition of term 'borehole seismic data', 1 page.

Schlumberger, The Oilfield Glossary, printed from Internet address: http://www.glossary.oilfield.slb.com/search.cfm, on Aug. 14, 2007, definition of term 'flexural mode', 1 page.

Crain, How Many Acoustic Waves Can Dance on the Head of a Sonic Log?, Spectrum 2000 Mindwave, Originally Published: CWLS InSite, Apr. 2004, 9 pages.

Mougenot, D., Exploration Report, Pushing Toward The Low Frequencies, WorldOil.com, Sep. 2005, vol. 226 No. 9, printed on Dec. 10, 2007 at internet address: http://compsitecatalog.com/magazine/MAGAZINE_DETAIL.asp?ART_ID=2671&MONTH_YEAR=Sep-2005, pp. 1-12 (word version also attached, 9 pages).

International Search Report for International Application No. PCT/US2007/013382; mailing date Mar. 13, 2008; 4 pages.

Written Opinion of the International Searching Authority for International Application No. PCT/US2007/013382; 5 pages.

Puryear, Charles I. and Castagna, John P., "Layer-thickness determination and stratigraphic interpretation using special inversion: Theory and application", Geophysics, vol. 73 No. 2 (Mar.-Apr. 2008) pp. R37-R48.

Office Action regarding Eurasian Application No. 200870622 from the Eurasian Patent Office dated Apr. 22, 2009, 11 pages.

Response to Office Action regarding Eurasian Application No. 200870622 filed with the Eurasian Patent Office on May 24, 2010, 7 pages.

Office Action regarding Eurasian Application No. 200870622 from the Eurasian Patent Office dated Oct. 22, 2010, 3 pages.

Response to Office Action regarding Eurasian Application No. 200870622 filed with the Eurasian Patent Office on Nov. 22, 2010, 7 pages.

* cited by examiner

METHOD FOR SELECTIVE BANDLIMITED DATA ACQUISITION IN SUBSURFACE FORMATIONS

CROSS-REFERENCE TO RELATED APPLICATIONS

This application is a continuation of U.S. application Ser. No. 12/048,722 filed Mar. 14, 2008, which is a continuation of U.S. application Ser. No. 11/451,571 filed Jun. 13, 2006, which are both incorporated by reference in their entireties.

STATEMENT REGARDING FEDERALLY SPONSORED R/D

Not applicable.

BACKGROUND OF THE INVENTION

1. Field of the Invention

The Invention relates generally to the field of seismic data acquisition. More specifically, the invention relates to methods for selective bandlimited data acquisition in real time, resulting In improved imaging of economically valuable or useful earth targets of Interest.

2. Background Technology

Surface acoustic sources generate seismic waves from the surface and operate at relatively low frequencies resulting in low-resolution surveys. A few downhole seismic sources have been developed which transmit acoustic waves into the formation through a borehole medium. These downhole sources can operate at a higher frequency than surface sources but often do not generate enough energy to result in accurate surveys.

Conventional downhole sources include:

the cylindrical bender source using piezoelectric rings bonded to a tube developed by Southeast Research Institute and described in Balogh et al.'s, "New Piezoelectric Transducer for Hole-to-Hole Seismic Applications," 58th Annual International Meeting of the Society of Exploration Geophysics (1988), Session DEV2.5; the electro-acoustic transducer cylindrical bender source developed by Kompanek and described in U.S. Pat. No. 4,651,044; the arc discharge pulse source developed by Southwestern Research Institute as described in U.S. Pat. No. 5,228,011; the swept frequency borehole source developed by Western Atlas and described in Owen et al.'s, "Arc Discharge Pulse Source for Borehole Seismic Applications," 58th Annual International Meeting of the Society of Exploration Geophysics (1988), Session DEV2.4; the potential energy "drop mass" source developed by Institut Francais du Petrole (IFP) as described in U.S. Pat. No. 4,505,362; the hammer launched source developed by OYO Corporation and described in Kennedy et al.'s "A Swept-Frequency Borehole Source for Inverse VSP and Cross-Borehole Surveying," 7.sup.th Geophysical Conference of the Australian Society of Exploration Geophysics (1989), Volume 20, pages 133-136;and the orbital vibrator developed by Conoco and described In Ziolkowksl et al.'s "Determination of Tube-Wave to Body-Wave Ratio for Conoco Borehole Orbital Source," 69th Annual International Meeting of the Society of Exploration Geophysics (1999), pages 156-159.

A few sources have been developed that are clamped against the borehole wall. These sources are generally more difficult to design, and not many have been developed. One source utilizes a hydraulic vibrator clamped against the borehole wall to oscillate a reaction mass axially or radially and is more fully described in Turpening et al.'s "Imaging with Reverse Vertical Seismic Profiles Using a Downhole, Hydraulic, Axial Vibrator," 62nd Meeting of EAGE (2000), Session P0161.

Some of the most recent and promising techniques for improved imaging use complicated mathematics, such as Fourier transforms, to deconstruct the seismic data into discrete frequencies. As is well known, a Fourier transform utilizes windows, which suffer from the time-resolution frequency-localization tradeoff.

When the harmonic frequency of the desired target of interest is displayed, the image becomes much clearer than the broadband seismic image. This resonance effect is described in The Leading Edge, Interpretational Applications of Spectral Decomposition in Reservoir Characterization, Greg Partyka, 1999.

Recently, the more advanced technique of using wavelet transforms, which mitigate the significant windowing problems associated with Fourier transforms, has been successfully applied to geophysical problems.

Patent application 20050010366 of John Castagna describes the technique of Instantaneous Spectral Analysis, which decomposes the seismic signal from the time domain to the frequency domain by superimposing members of a preselected "wavelet dictionary" onto the trace, cross-correlating, and subtracting the energy of the wavelets until some predefined minimum threshold is reached. The result is a spectrum for each time location on the trace. More on this subject can be found in "The Leading Edge Instantaneous Spectral Analysis", John Castagna, 2003. Partyka, G. A., Gridley, J. A., and Lopez, J. A., 1999, Interpretational aspects of spectral decomposition in reservoir characterization: The Leading Edge, 18, 353-360. Castagna, J. P., Sun, Shenjie, and Siegfried, R. W., 2003, Instantaneous spectral analysis: Detection of low-frequency shadows associated with hydrocarbons, 120-127. Marfurt, K. J. and Kirlin, R. L., 2001, Narrow-band spectral analysis and thin-bed tuning: Geophysics, 66, 1274-1283. The results obtained from data deconstruction are essentially based on mathematical estimates.

Another recent industry development is time-lapse production imaging commonly termed 4D seismic monitoring. It is a method of viewing the reservoir with repeat surveys to determine how it is draining dynamically. Essentially, the seismic surveys are repeated with as much precision as possible in order to generate data sets that differ only with respect to changes associated with reservoir production: By finding the residual between the time-lapse images, one is able to infer subsurface fluid flow patterns and place constraints on fluid conduits and baffles associated with the drainage, thereby enabling one to modify reservoir models and future drilling plans. Because these changes can be subtle, any improvement of the signal-to-noise ratio would have a beneficial effect for 4D monitoring.

Accurate repositioning of the seismic source is considered one of the most critical elements in achieving 4D monitoring precision. Furthermore, a priori knowledge of the source signature would be beneficial. More on the subject can be found in the book "4D Reservoir Monitoring and Characterization" by Dr. Rodney Calvert.

The frequency range that is providing a given image is governed by the seismic wavelet, which initially represents the source signature and then changes as it experiences a number of earth-filtering effects, including absorption, geometrical spreading, and scattering. Better knowledge of the seismic source improves processes that remove the earth filtering effects.

Additional Related prior art can be found in the following:

| | | |
|---|---|---|
| 6,985,815 | January 2006 | Castagna et al, |
| 6,661,737 | December 2003 | Wisniewski et al, |
| 5,093,811 | March 1992 | Mellor et al, |
| 6,619,394 | September 2003 | Soliman et al, |
| 200,200,700,17 | June 2002 | Soliman et al, |
| 5,077,697 | December 1991 | Chang, |
| 5,418,335 | May 1995 | Winbow, |
| 5,371,330 | December 1994 | Winbow, |
| 200,500,757,90 | April 2005 | Taner, M. Turhan et al, |
| 6,814,141 | November 2004 | Huh et al, |
| 200,201,486,06 | October 2002 | Zheng, Shunfeng et al, |
| 200,201,793,64 | December 2002 | Bussear, Terry R et al, |

Variable Frequency Seismic Sources

U.S. Pat. Nos. 4,014,403, 4,049,077, 4,410,062, 4,483,411 and 4,578,784 Issued to Joseph F. Mifsud describe tunable frequency land and marine seismic vibrators.

U.S. Pat. No. 4,014,403 relates to a vibrator in which the frequency of vibration changes as the stiffness of a spring is automatically adjusted. As a result, the impedance of the spring resonates with the impedance of the reaction mass to maximize the reaction impedance, thereby increasing the operating efficiency of the vibrator.

U.S. Pat. No. 4,049,077 shows the use of a coupling plate as feedback for controlling the vibrator operation. At low frequencies, the feedback is proportional to the coupling plate position, and at higher frequencies, the feedback is proportional to the coupling plate velocity.

U.S. Pat. No. 4,410,062 shows a compliant member whose compliance is such that it is substantially rigid at the natural frequency of the vibrator, and the natural frequency of the driven load of the vibrator is within the seismic spectrum but is higher than the natural frequency of the vibrator.

U.S. Pat. No. 4,483,411 shows a seismic source, which produces a varying FM signal at the low end of the acoustic spectrum. The seismic source uses stiff oscillating radiators to create a signal in the water. These radiators are attached to devices acting as springs with a variable spring rate. Variation of the spring rate as a function of the frequency permits the device to be tuned for maximum power output.

U.S. Pat. No. 4,578,784 shows a seismic source, which produces a varying FM signal generally within the 10-100 Hz region of the spectrum.

U.S. Pat. No. 5,146,432 describes a method of characterizing transducers, and the use of a characterized transducer in the measurement of the impedance of cement located behind a section of a casing in a borehole.

U.S. Pat. No. 6,928,030 describes a seismic defense system having a closely monitored seismic source used to relay vital information from the source to the receiver.

U.S. Pat. No. 6,661,737 describes a tool including a programmable acoustic source that is controlled by a computer. The tool is used for logging.

Resonance

U.S. Pat. No. 5,093,811 refers to a fracture study technique in which resonance is established In the borehole to investigate fracture dimension by comparing the standing wave response at the wellhead to the modeled response.

U.S. Pat. Nos. 5,137,109 and 6,394,221 refer to seismic sources that sweep through a range of frequencies, the first utilizing hydraulic pressure to vary the resonance frequency of the device itself, and the second utilizing a series of variable frequency impacts to sweep the seismic range. Both are concerned with the seismic source itself and not with adjusting the source output to reach a resonant frequency of the target of interest.

U.S. Pat. No. 5,239,514 refers to a tool having frequencies In the 500-1500 Hz range, equivalent to a seismic band of 10-30 Hz, which includes much of the typical seismic band. Longer source intervals and stacking are used to Increase energy and the signal-to-noise ratio. This tool does not adjust the source output to reach a resonant frequency of the target of interest in order to increase the signal-to-noise ratio, nor does it use multiple narrowbands.

U.S. Pat. Nos. 4,671,379 and 4,834,210 describe a tool that creates a standing resonant pressure wave whose frequency depends on the spacing between two end means in a borehole. Frictional, structural, and radiated acoustic energy loses are compensated for by continued application of pressure oscillations. This tool relies on establishing resonance at the source and not at the target of interest.

U.S. Pat. No. 5,081,613 describes a method that generates pressure oscillations that produce resonant frequencies in the wellbore. After removing the effects of known reflectors, the resonant frequencies are used to determine the depth and impedance of downhole obstructions. While this method does take advantage of resonance, it is confined to the wellbore and not to the target of interest.

As attested by the above references, the geophysical industry has struggled, and continues to struggle, to develop improved data acquisition techniques for improved imaging, as well as for better and easier characterization of targets of interest that are economically suitable for production, and for guidance in selecting optimum well locations with reduced investments.

SUMMARY OF THE INVENTION

It is a primary object of this Invention to address some of the prior art limitations mentioned above by extending the capabilities of known seismic sources and methods for data acquisition. The method of this invention for exploring desired characteristics of a subsurface sector is based on selectively transmitting suitable narrowband energy waves into the subsurface sector, thereby producing narrowband signals reflected off the subsurface sector. An operator in the field can selectively adjust the transmitted narrowbands in real time so as to extract optimum illumination of the desired characteristics from the explored sector. Also, the narrowband signals reflected off the subsurface sector are preferably collected and recorded on location in real time, as well as displayed on a monitor in real time for assisting the operator to continue making the necessary frequency adjustments.

BRIEF DESCRIPTION OF THE DRAWINGS

FIGS. 3-8 show plots of the response amplitude of a target of interest vs. frequency.

DETAILED DESCRIPTION OF THE INVENTION

Defined Terms

"target of interest" is a subsurface geological unit of economic interest,

"target" means target of interest,

"formation" is a general subsurface geological unit that is not necessarily considered a target of interest, "sector of interest" is a part of the target of interest, "source" is a unit that supplies energy such as acoustic energy, "source", and "transmitter" are used interchangeably, "receiver" is an acoustic-to-electric converter that receives acoustic energy, "array" is a collection of sources, receivers, or any other grouping of devices arranged for a specific purpose, "real time" means work in process, "resonance" means increased amplitude of reflection of an object subjected to energy waves by the source at or near its own natural frequency of constructive interference, "distortion" means decreased amplitude of reflection of an object subjected to energy waves by the source at or near its own natural frequency of destructive interference, "resonant frequency" means a frequency at which resonance occurs, "distortion frequency" means a frequency at which distortion occurs, "harmonic" means any resonant frequency, "fundamental frequency" is the lowest non-zero resonant frequency, "period of resonance" is the range of frequencies between two resonant frequencies or distortion frequencies, "narrowband" is a range of frequencies significantly less than the period of resonance of the target of interest at the fundamental frequency, "broadband" is a range of frequencies greater than a narrowband, "bandlimited" means narrowband, "resolution" means the ability to separate two features, such as closely spaced reflection interfaces, "trace" is a record of received seismic signals, "stack" is a composite record made by combining different records, "Interactive" means adjusting the acoustic source in real time typically based on data received from the receivers, "Impedance" means the product of density and velocity, and "reflection coefficient" means the ratio of the amplitude of the reflected wave to that of the incident wave. Note: a low impedance layer over a high impedance layer will produce a positive reflection, and a high impedance layer over a low impedance layer will produce a negative reflection.

DESCRIPTION OF THE METHOD OF THE INVENTION

Figure 1A:
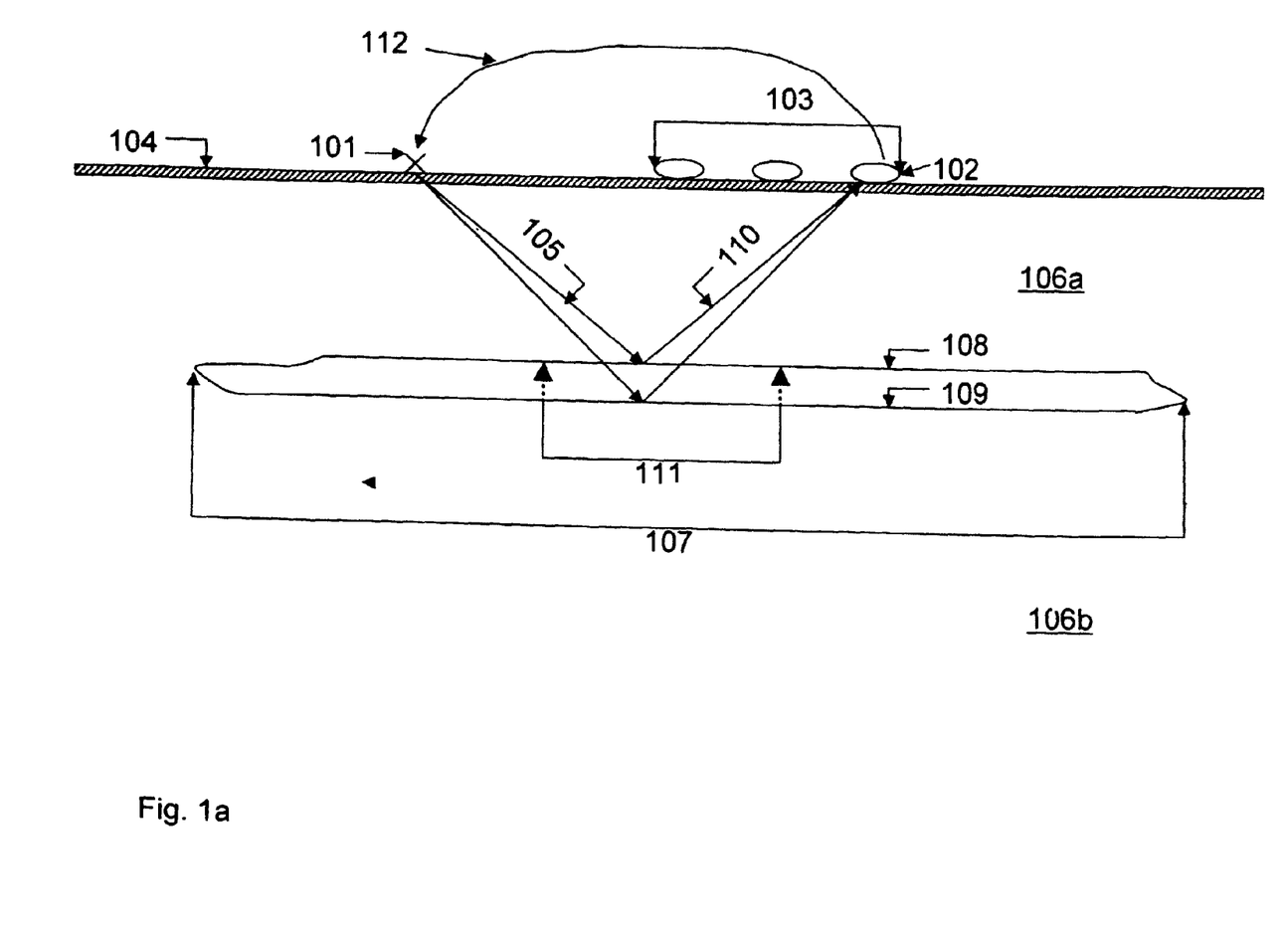
FIG. 1a illustrates an embodiment of this invention in which a bandlimited source and a receiver array are both positioned on the earth surface.
Figure 1B:
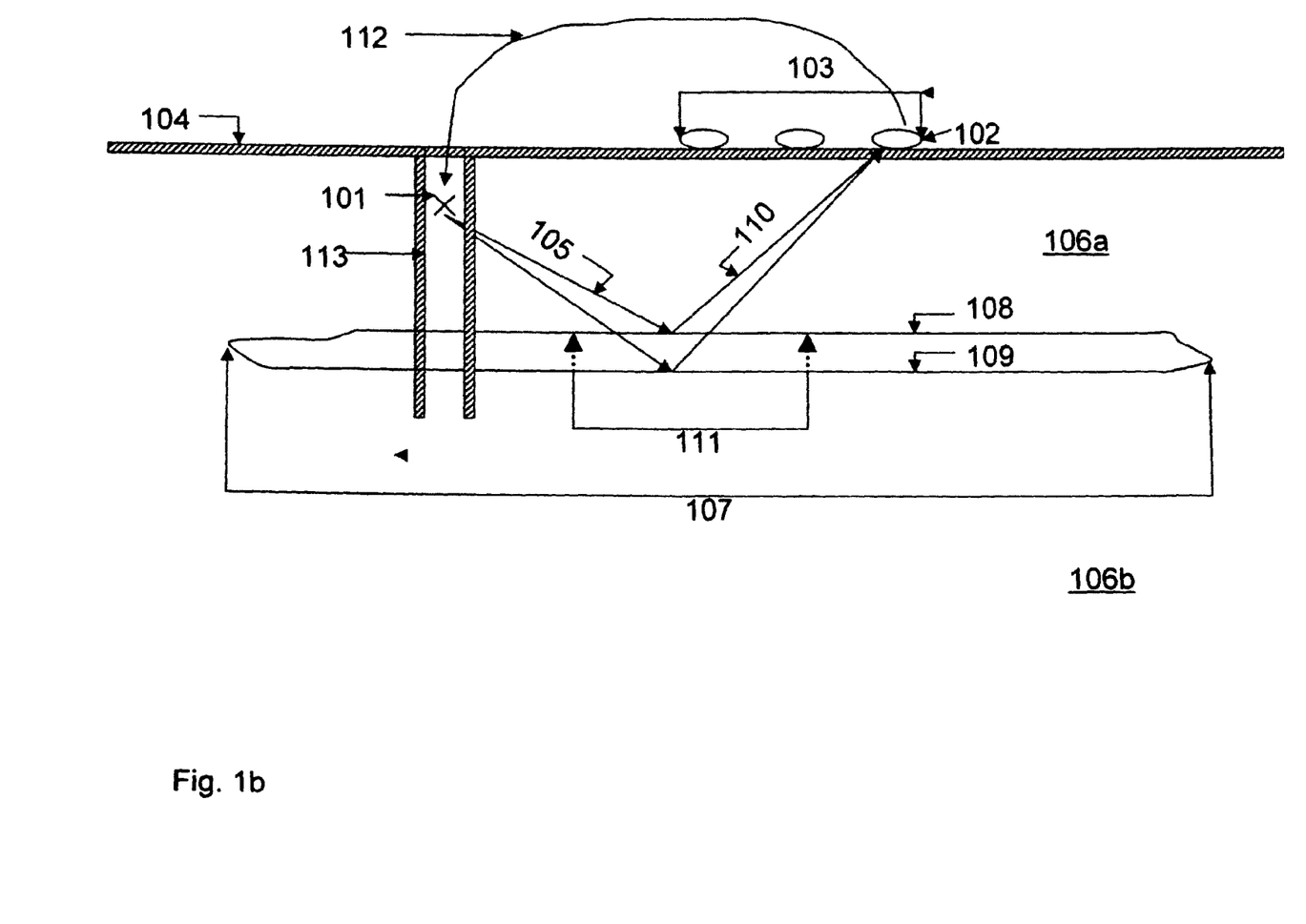
FIG. 1b illustrates another embodiment of this invention in which a bandlimited source is positioned in a borehole and a receiver array is on the earth surface.

In FIGS. 1a and 1b source 101 and receiver array 103 are shown utilized on earth surface 104, or in an open borehole 113 of any orientation, which is preferably a vertical or near-vertical borehole.

FIG. 1a illustrates an embodiment in which bandlimited source 101 and receiver array 103 are placed on surface 104.

FIG. 1b Illustrates an embodiment In which a bandlimited source 101 is placed in wellbore 113 and receiver array 103 is placed on surface 104.

In use, source 101 transmits bandlimited vibratory waves 105 into ground 106, which, after reflecting off the interfaces of target of interest 107, are sensed or measured by appropriately positioned receivers 102 in array 103.

When source 101 is activated, it generates downgoing vibratory waves 105 within narrowbands, which propagate through underground formations 106 to target of interest 107.

Reflections of these waves from interface 108, between upper formation 106a and target of interest 107, and Interface 109 between target of interest 107 and lower formation 106b, return as bandlimited upgoing waves 110 to receivers 102 at the surface.

In the preferred embodiment, a sector of interest 111 can be studied using an array of receivers 103, which process the received bandlimited upgoing waves 110. From the receivers they are utilized as inputs to adjust source 101 through feedback loop 112.

Figure 2A:
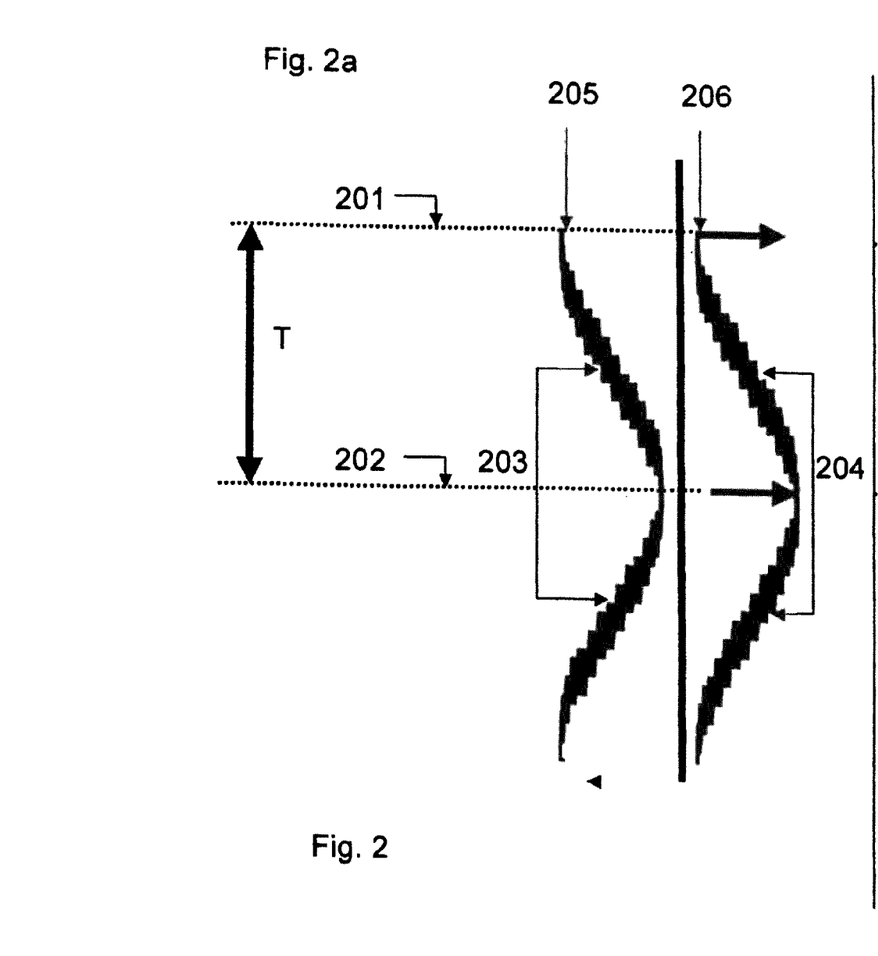
FIGS. 2a and 2b illustrate an impingement of bandlimited waves on top and base of a target of interest for a normal-incidence reflection.
Figure 2B:
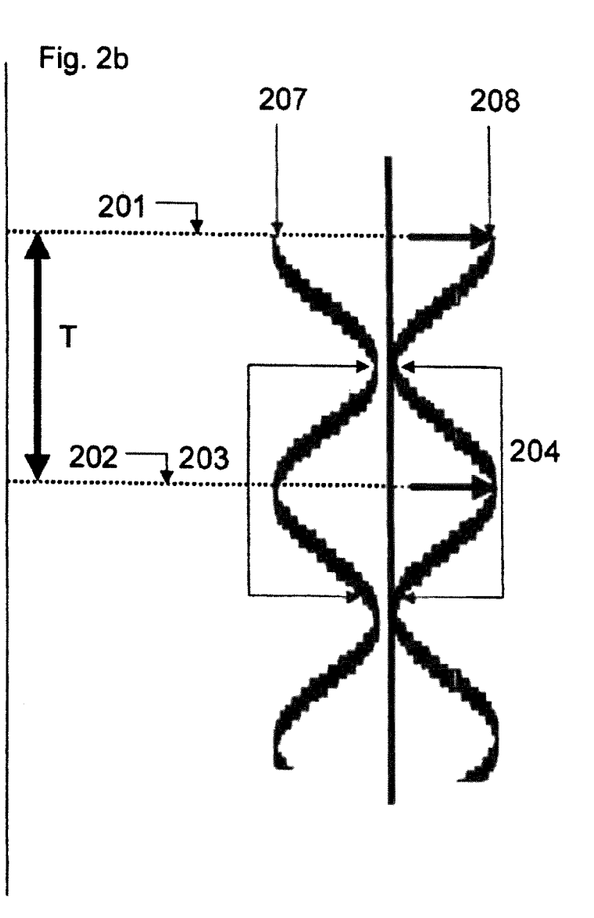

FIGS. 2a and 2b illustrate the impingement of bandlimited waves 105 in FIG. 1 on top 201 and base 202 of the target of interest for a normal-incidence reflection.

FIG. 2a shows the impingement of a sinusoid having a period equal to twice the target thickness upon the two interfaces. Frequency f is equal to the inverse of the period or $f=1/t$, where t is the period of the wave. Assuming a low impedance target, with a deflection to the right (FIG. 2a) being positive and equal and opposite coefficients of reflection, the wave 203 reflected from top 201 and the wave 204 reflected from base 202 is shown side-by-side. In this case trough 205 from top reflected wave 203 aligns with trough 206 from bottom reflected wave 204, yielding constructive interference.

FIG. 2b shows the impingement of a sinusoid having a period equal to the target thickness upon the two interfaces. Once again, the wave 203 reflected from top 201 is shown side-by-side with the wave 204 reflected from base 202. In this case, trough 207 from top reflected wave 203 aligns with peak 208 from bottom reflected wave 204, thereby creating destructive interference.

Figure 3:
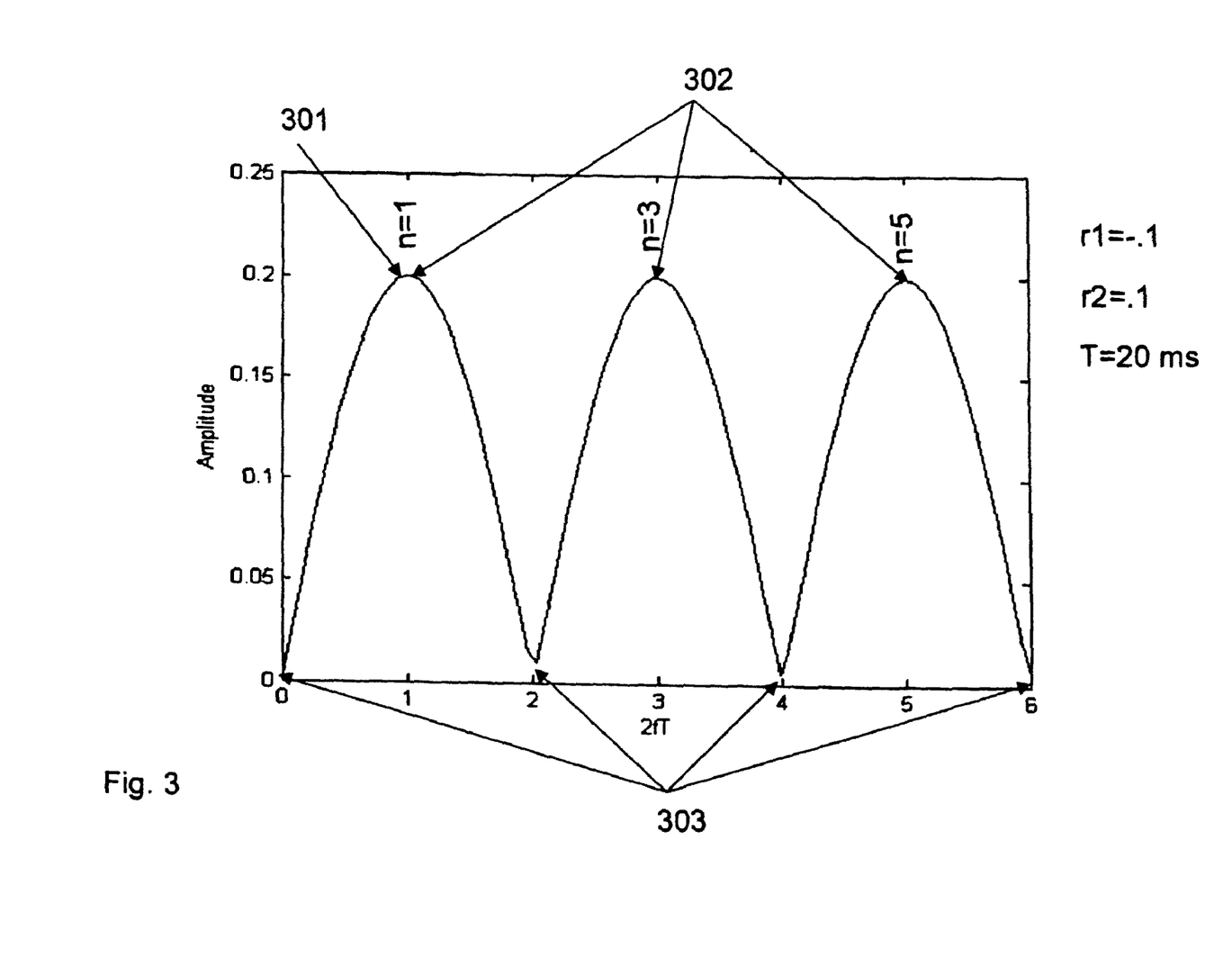
FIG. 3 shows a plot of the fundamental odd frequency as a member of a set of odd harmonics.

FIG. 3 shows a plot of amplitude vs. twice the product of frequency f and target thickness T with odd harmonics, which occur for the case of reflection coefficients with opposite sign. In this example, the reflection coefficients are also equal in magnitude. Destructive interference occurs at odd integer values of twice the product of frequency and target thickness. The plot shows fundamental odd frequency 301 as a member of the set of odd harmonics 302 that repeat at every point $fT=n+\frac{1}{2}$, where n is a real positive integer or zero. The odd distortion frequencies 303 repeat according to $fT=n$.

Figure 4:
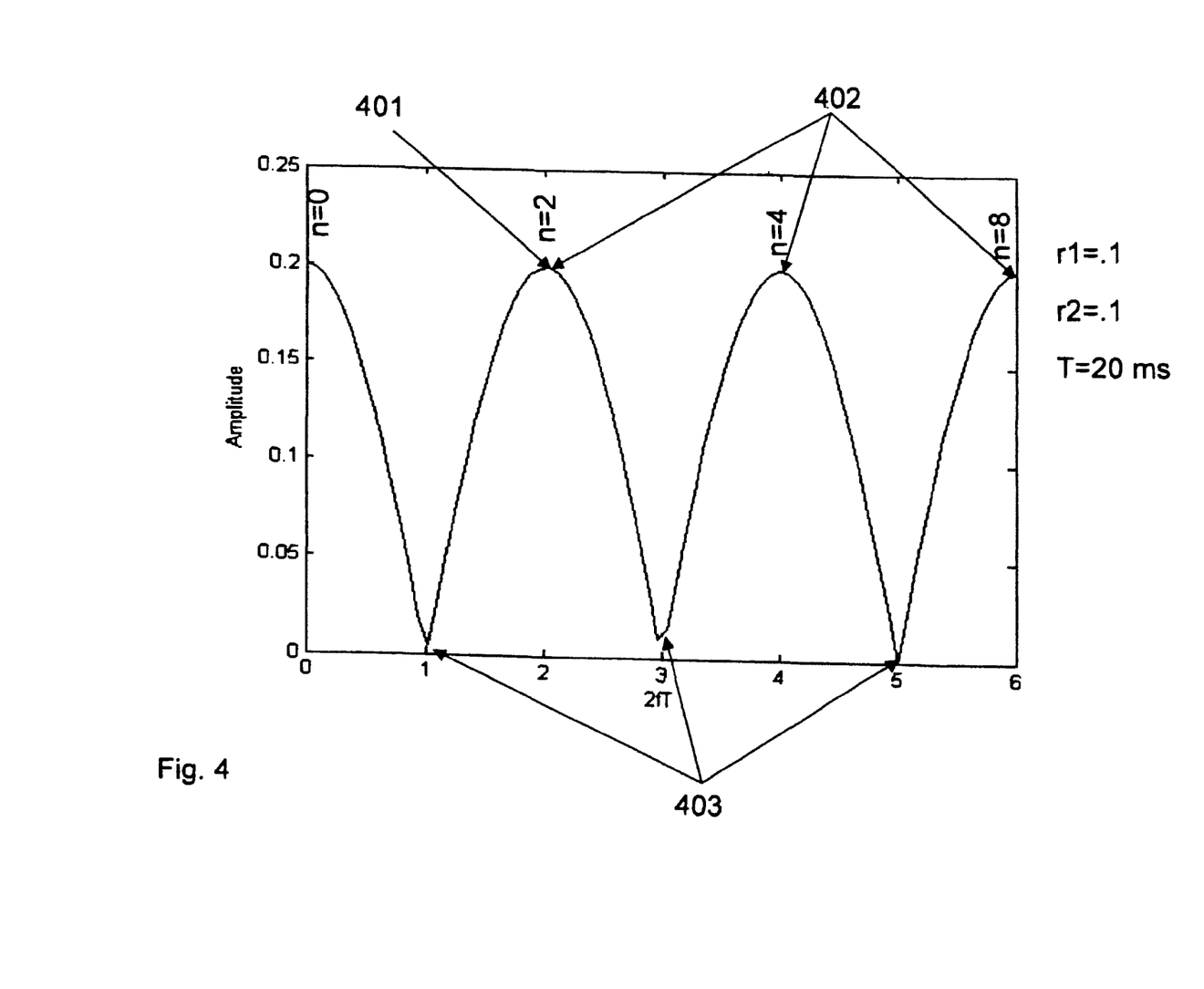
FIG. 4 shows a plot of the fundamental even frequency as a member of a set of even harmonics.

FIG. 4 shows a plot of amplitude vs. twice the product of frequency and target thickness with even harmonics, which occur for the case of reflection coefficients with the same sign. In this example, the reflection coefficients are also equal in magnitude. Constructive interference occurs at even integer values of twice the product of frequency and target thickness. The plot shows fundamental even frequency 401 as a member of the set of even harmonics 402 that repeat at every point $fT=n$, where n is a real positive integer or zero. The even distortion frequencies 403 repeat according to $fT=n+\frac{1}{2}$.

In practice, most reflection coefficient pairs will not be equal in magnitude, in which case they can be decomposed into even and odd components. Also, the number of harmonics that are actually useful for imaging is generally small and depends strongly on the signal-to-noise ratio.

Figure 5:
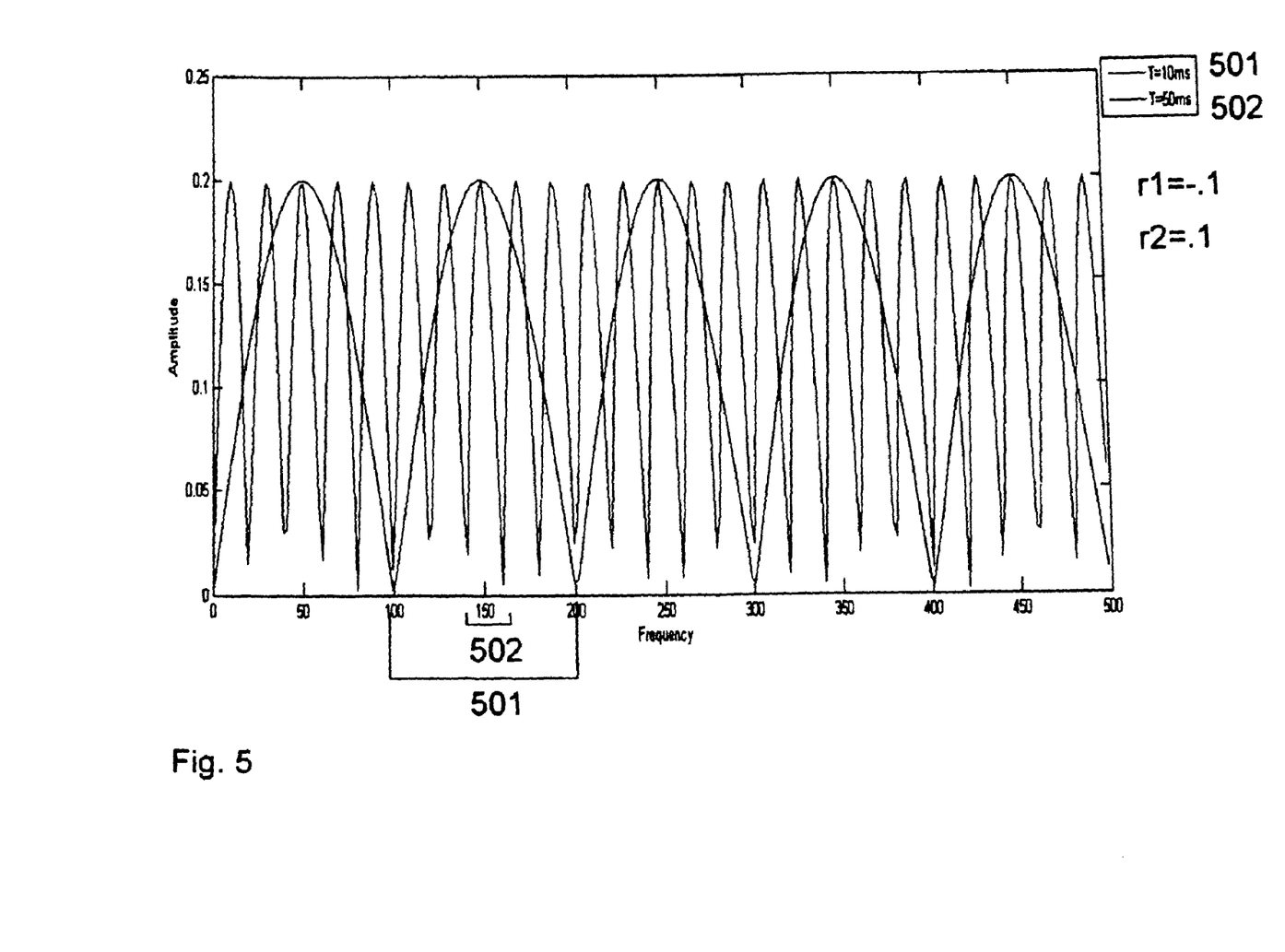
FIG. 5 compares the frequency response of two different targets with different thicknesses.

FIG. 5 shows a dual plot of amplitude vs. frequency and illustrates the thickness-dependant frequency response of two different targets. The period of resonance P is equal to the inverse of the target thickness or $P=1/T$ where T is the target thickness. Thus, thicker targets show a smaller resonance period. The response period for a 10 ms thick target 501 is compared with the response period for a 10 ms thick target 502.

Figure 6:
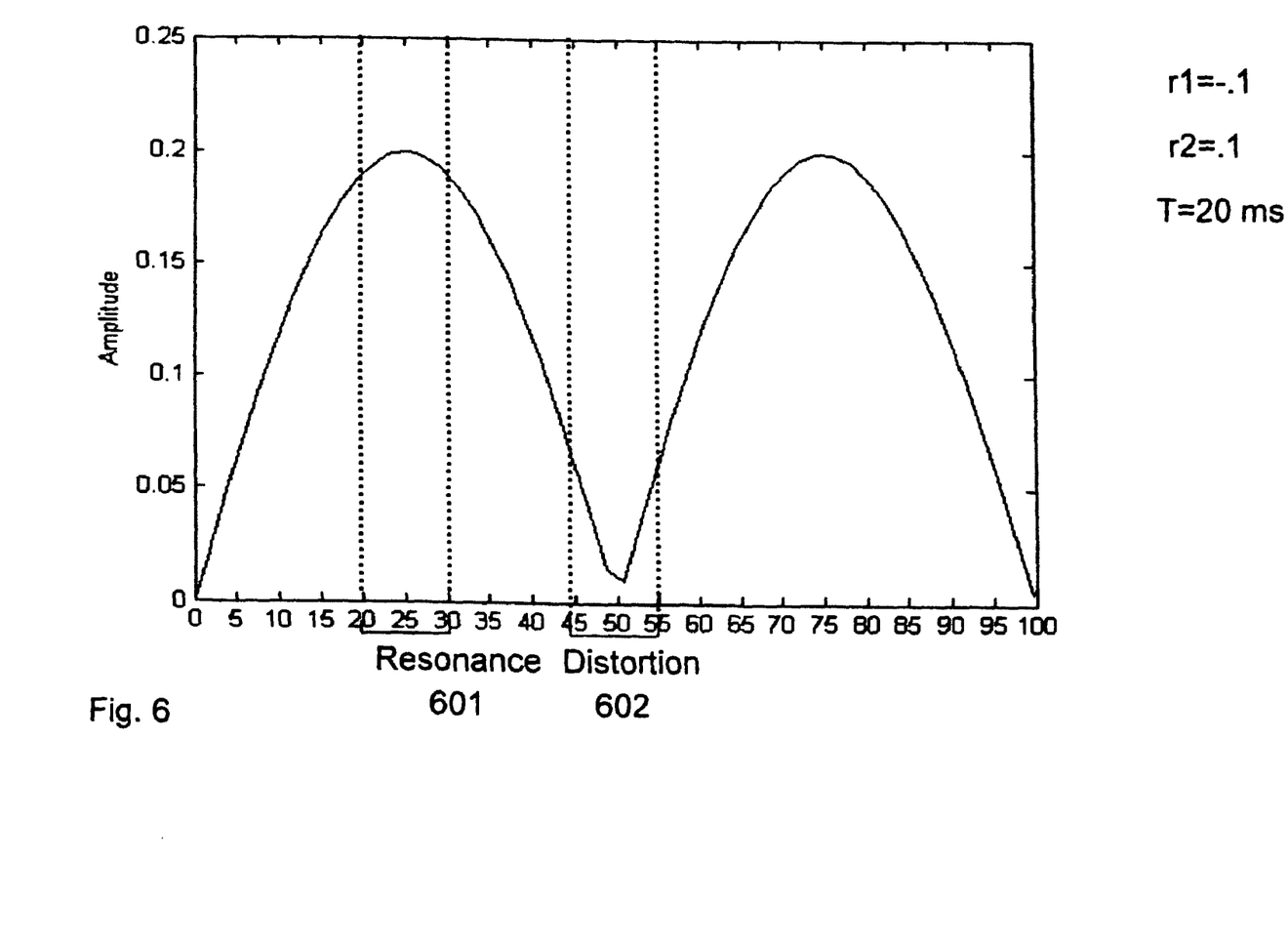
FIG. 6 shows the advantage in terms of response amplitude of a narrowband centered on a resonant frequency over a narrowband centered on a distortion frequency.
Figure 7:
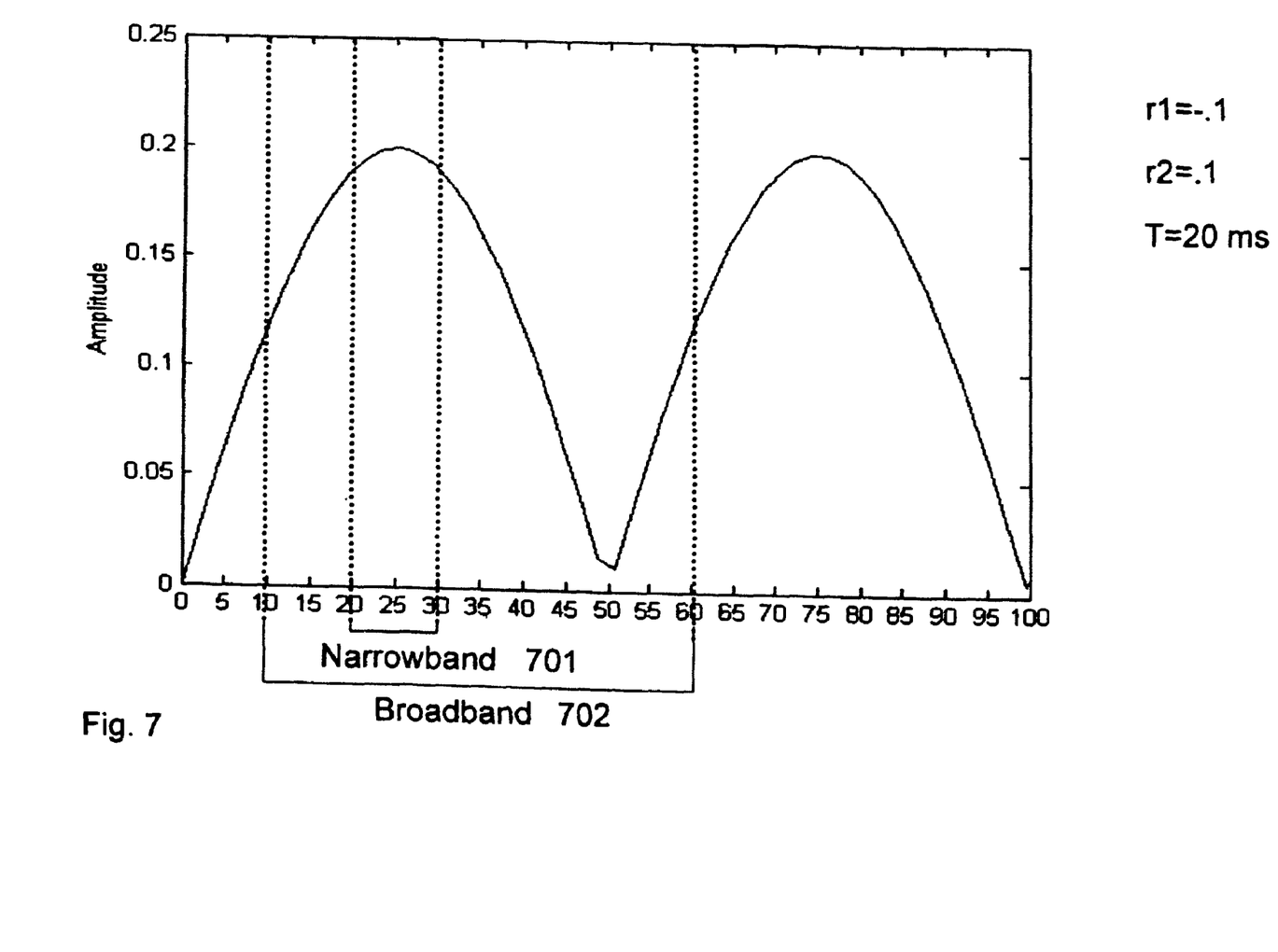
FIG. 7 shows the advantage of using a narrowband centered on a resonant frequency, which captures the peak broadband amplitude, over using a broadband, which includes distortion frequencies.

FIGS. 6 and 7 show plots of the amplitude of the response of target 107 in FIG. 1 vs. frequency for an odd pair, where $T=20$ ms. Filtering effects are neglected for emphasis.

FIG. 6 illustrates the substantial difference in the response amplitude for a bandlimited signal 601 centered on a resonant frequency at 25 Hz as opposed to a bandlimited signal 602 centered on a distortion frequency at 50 Hz. Accordingly, the signal-to-noise ratio will be much greater for the bandlimited signal centered on the resonant frequency.

FIG. 7 shows the increased average amplitude of the target response for a 20-30 Hz narrowband signal 701 centered on a resonant frequency $f=25$ Hz over the target response for a 10-60 Hz broadband signal 702. Accordingly, the signal-to-noise ratio will be greater for the bandlimited signal centered on the resonant frequency than for a broadband signal.

Figure 8:
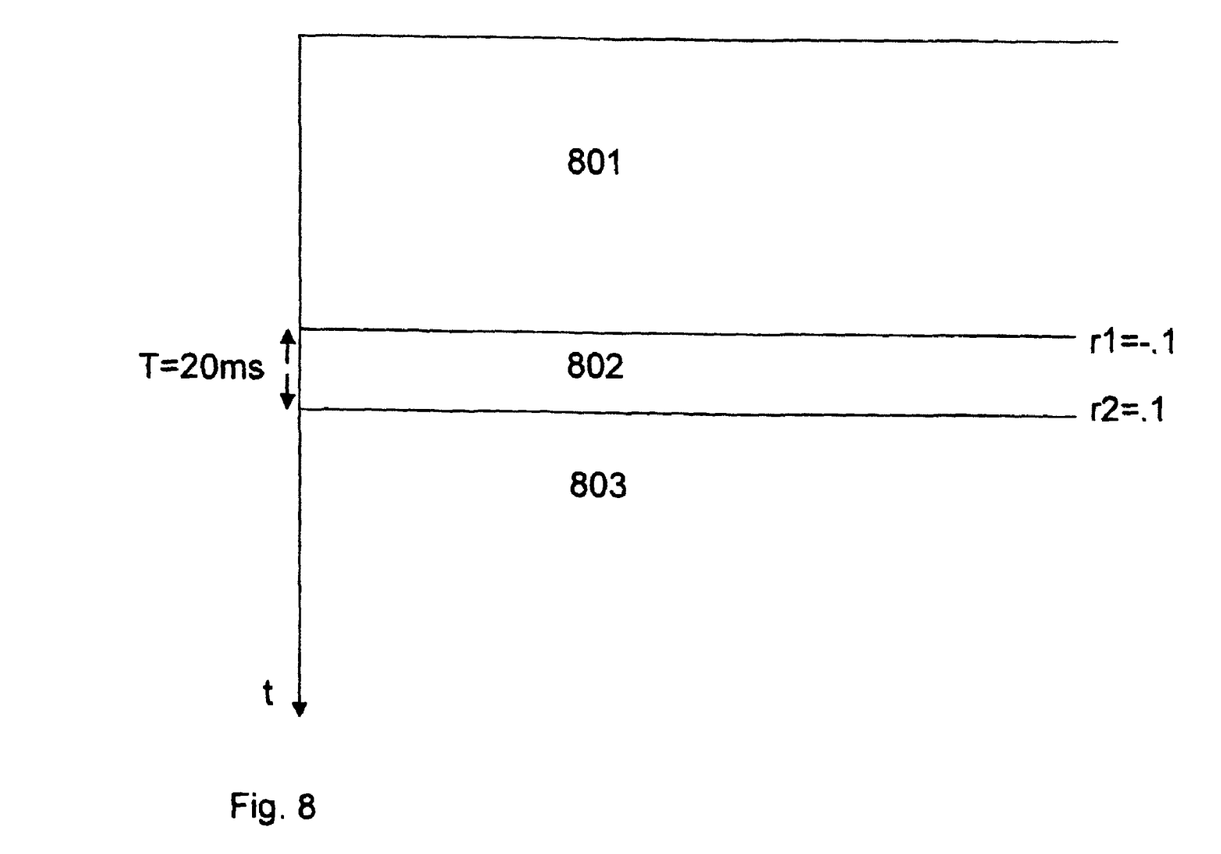
FIG. 8 shows a potential target of interest, which could be a thin sand target between two shale formations.

FIG. 8 shows a possible target of interest, which could be a thin sand target encased in shale. The uppermost formation 801 and the lowermost formation 803 enclose a thin layer 802.

Figure 9:
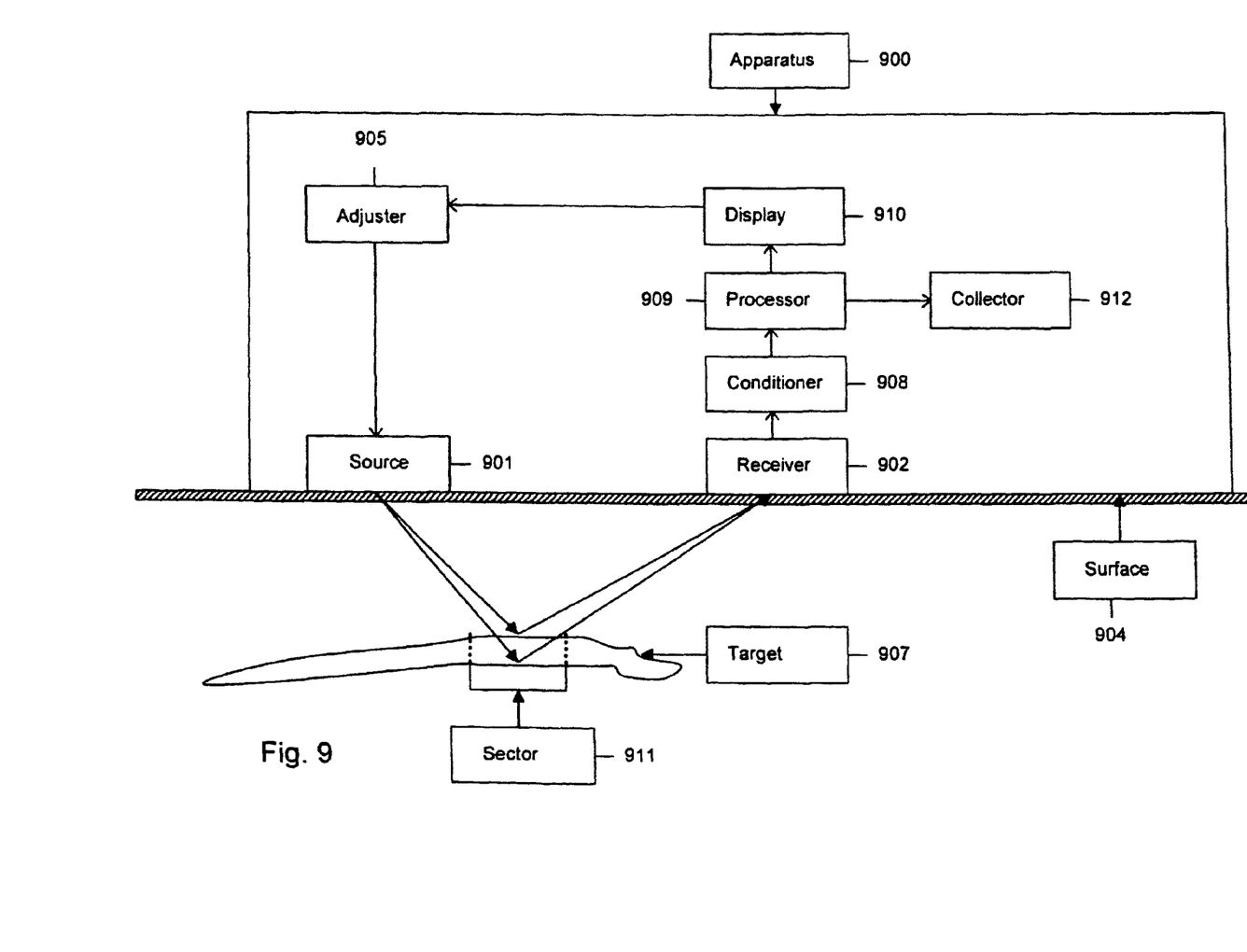
FIG. 9 is a schematic block diagram of an apparatus using the method of the Invention.

FIG. 9 shows a seismic apparatus 900 having a bandlimited seismic source 901 optimally positioned next to a receiver 902 on earth surface 904. When source 901 is activated, it transmits downgoing vibratory narrowband waves into the ground. After reflecting off sectors of interest 911, these waves return as bandlimited upgoing waves to receiver 902 at the surface.

The signals generated by receiver 902 are passed to a signal conditioner 908, which amplifies, filters and converts the analog signals to digital signals. The resulting digital signals are passed to a processor 909, which converts them into image signals.

The digital image signals from processor 909 are passed to imaging means, illustrated as a display 910, which can be a conventional black-and-white or color monitor. The digital signals from processor 909 are also passed to a digital data collector 912.

In operation, an operator of apparatus 900 controls the output signals from source 901 through a signal adjuster 905 that is designed to control the source and its energy output.

The operator evaluates the images presented on display 910 and decides whether the video signals have been optimized. If the answer is yes, the acquisition data is stored in data collector 912 and data collection continues. If the answer is no, the operator uses signal adjuster 905 to adjust the output of source 901 until the image on display 910 more closely approximates the optimal harmonic resonance response expected from sector of interest 911.

A memory unit (not shown) in processor 909 stores Information indicative of the received bandlimited return signals, which can be further processed depending on future needs. A communication device (not shown) in apparatus 900 can allow for direct communication with remotely located control units.

Using a feedback loop from processor 909 to adjuster 905, the desired source output adjustments could be executed automatically, thereby allowing the operator to intervene only as a troubleshooter.

Sources

Conventional sources in the above mentioned prior art include surface acoustic sources, downhole seismic sources, swept frequency borehole sources, tunable frequency land and marine seismic vibrators, feedback-controlled vibrators, orbital vibrators, programmable acoustic sources that are controlled by a computer, sources that are clamped against the borehole wall, and others.

The preferred seismic energy source for practicing the method of this invention is a controlled-frequency adjustable acoustic source capable of transmitting frequencies within narrowbands. It can be positioned on the surface or inside a borehole. It can be conveyed into an open borehole by any known means such as production tubing, coiled tubing, cable, wireline, etc.

The source may produce bandlimited vibratory waves either simultaneously or sequentially, which can be held constant for some predetermined duration, or can be varied incrementally. When the source is activated it transmits vibratory waves into the ground within narrowbands, which, after reflecting off the targets of interest, are sensed and measured by the appropriately positioned receivers.

Receivers

A conventional receiver has long been a velocity measuring geophone. However, accelerometers are becoming more widely utilized, and multi-axis, or multi-component, accelerometers are emerging. Multi-component three axis sensing has produced superior images of the subsurface as compared to single component sensing.

Receivers provide signals indicative of the sensed seismic energy to an acquisition device that can be co-located with the receiver unit and coupled thereto for receiving the signal. A memory unit is disposed in the acquisition device for storing Information indicative of the received signal. A communication device may also be co-located with the receiver/acquisition unit for allowing direct communication with a remotely located control unit.

In the crosswell or interwell seismic technique, the source is placed in a borehole and the receivers are placed in adjacent boreholes. When using a reverse vertical seismic profiling technique, the source is placed in a borehole and the receivers are placed along the surface as shown in FIG. 1*b*. In the long spacing sonic technique, both the seismic source and the receiver are placed in the same borehole. The crosswell technique is preferred. Both the source and the receivers can also be placed on the surface as shown in FIG. 1*a*.

Bandlimited Data Acquisition

When correlated to the harmonics of a specific target of interest, each received bandlimited segment will have improved accuracy over broadband collection due to elimination of many waves that are not conducive to imaging, such as those created by uncontrolled seismic energy sources.

Through the production of energy within selected multiple narrowbands, the details of individual geologic targets of interest become accentuated. This is because each target of interest responds optimally to energy produced within specific narrowbands centered on harmonics.

Harmonic resonance occurs when the bandlimited reflections from two interfaces are In phase as shown in FIG. 2a, thereby producing an amplified reflection that is the sum of the reflection coefficients.

Harmonic distortion occurs when the bandlimited reflections from the two interfaces are 180 degrees out of phase as shown in FIG. 2b, in which case the amplitude will be the difference between the reflection coefficients. If the reflection coefficients are equal, harmonic distortion results in complete destruction of the signal.

If the reflection coefficients are equal in magnitude and opposite in sign, the response will show odd harmonics as shown in FIG. 3. If the reflection coefficients are equal in magnitude and equal in sign, the response will show even harmonics as shown in FIG. 4. In the general case, the response will be some combination of these two components, in which case the larger component will dominate.

Once the fundamental frequency of a given target of interest has been determined by adjusting the frequency of the source, other harmonics will occur at a period that is the inverse of the thickness of the target of interest.

A target of interest with a given thickness will respond preferentially to energy produced at one set of harmonics, while a target of interest with another thickness will show a peak response to energy produced at another set of harmonics as shown in FIG. 5.

The central or peak frequency of the bandlimited waves applied by the source should be appropriate for the depth of penetration necessary to image the target of interest.

The range of narrowbands will occur within the range of seismic frequencies, which is generally between 10 Hz and 250 Hz, although this range can vary depending on the source and other specific imaging conditions.

Bandlimited collection of data can focus on a single target of interest or multiple targets of interest. For example, the data collection effort may focus on a petroleum reservoir, or on a petroleum reservoir together with the surrounding or encasing formations, or stacked petroleum reservoirs, each of which may have a distinct optimal narrowband for imaging.

Real Time Bandlimited Data Acquisition

Based on information received by the receivers, real time interactive frequency adjustments to the source can be made by an operator or by a feedback loop so as to induce harmonic resonance within the targets of interest.

By utilizing the harmonic response properties of the target of interest to make real time adjustments to the narrowband signals, the target of interest can be quickly and optimally imaged.

For example, if a target of interest is more optimally illuminated by one narrowband than by an adjacent narrowband, generally the narrowband with the superior response is closer to the harmonic resonance of the target of interest.

The speed with which accurate subsurface images can be obtained is often crucial to operations in the oilfield. Decisions involving the expenditure of vast sums of money are often necessarily made on short notice due to practical considerations, such as equipment scheduling and/or downtime.

Real time bandlimited data acquisition of the present invention enables an operator to interact directly during the data collection process.

The novel method reduces processing expenses significantly by permitting interactive real time adjustments to acquisition parameters that optimize target of interest response. Utilization of the narrowband producing harmonic resonance of the target of interest can reduce the processing time and inaccuracies inherent in current spectral decomposition methods, which can produce large volumes of data.

By focusing the acquisition on the naturally occurring harmonic resonance of the target of interest, significant non-pertinent data can be eliminated from consideration.

Eliminating the non-pertinent data intrinsically improves both the accuracy of the data and the speed with which a quality subsurface image can be produced. This also permits the tailoring of data acquisition and processing to the requirements of each unique application by reducing the volume of non-pertinent data.

The entirety of the data collected using the method of this invention, including that which is not used for immediate application, can be stored and made available for future analysis Involving other applications, which are presently known or which may be developed at some future date.

Narrowbands are collected independently of each other. However, if the signal-to-noise ratio is high at multiple harmonics, the narrowbands can be combined in ways that optimize the imaging of the subsurface target. Simply adding the time series of narrowbands centered on distinct harmonics will produce a more resolved image.

Thus, when used in conjunction with traditional stacking methods, the signal-to-noise ratio can be increased by narrowband imaging while maintaining resolution by combining multiple narrowbands.

Accordingly, a target of interest can be imaged at harmonics by inputting much less energy into the ground than would otherwise be required by the use of an uncontrolled energy source.

Earth-Filtering Effects

Earth filtering effects can modify and degrade the seismic signal. By making on the spot frequency adjustments in real time while knowing the seismic source, earth filtering effects can be better estimated and removed.

Traditionally, earth-filtering effects are removed by applying mathematical processes designed to remove these effects to the received seismic signal. Knowledge of the original bandlimited source signature provides additional constraints on the overall estimation of frequency-dependant earth filtering effects.

Spectral Information

Time-lapse reservoir 4D monitoring simply repeats former survey specifications, both in terms of source and receiver location and, for the method of this invention, source frequency ranges.

In one application, spectral information together with the instantaneous knowledge of the source signature may be used to guide selection of subsequent acquisition parameters for time-lapse monitoring, saving processing time and cost.

For a specific target, the need to estimate the narrowband parameters of the source is eliminated after the initial data collection effort. Thus, a priori knowledge of the optimal source signature parameters corresponding to the harmonics of the target of interest will improve accuracy and save time.

The angle of incidence of the reflection received from a given point on a target of interest is determined by the vertical position of the tool in the wellbore, the depth and orientation of the formation, the position of the receiver, and the physical parameters of the subsurface.

In one application, if the narrowband data is collected at various depths in adjacent wellbores, frequency-dependant AVO data can be collected. AVO stands for amplitude variation with offset.

AVO techniques known in the art provide estimates of acoustic and shear wave impedances for the media on either side of a reflecting interface, which are dependent on the parameters of the target of interest, including lithology, porosity, and pore fluid content. These estimates are based on various approximations to the Zoeppritz formulation of reflection coefficient variation as a function of incidence angle.

By collecting data within narrowbands, AVO attribute analysis is Improved. For example, utilization of frequency-dependant AVO attributes eliminates the need for bandwidth balancing.

Using "real" data as opposed to mathematically deconstructed data, the current method provides improved imaging, thickness estimation, and frequency-dependant AVO.

Therefore, focusing the data acquisition on the regions in the vicinity of the resonant frequencies maximizes the signal-to-noise ratio, as previously described.

The following expressions give the area under the curve for a plot of amplitude of reflectivity vs. frequency for a typical target of interest, which might be a sand encased in shale as In FIG. 8, and with thickness T=20 ms and an odd reflection coefficient pair r1=−0.1, and r2=1, utilizing
a broadband signal f=10-60 Hz, and
a bandlimited signal f=20-30 Hz $$\int_{10}^{60} [2r_o \sin(\pi f T)] df = (2r_o)\{[-1/\pi T\cos(\pi f T)](f=60) - [-1/\pi T\cos(\pi f T)](f=10)\} = 6.37 \tag{a}$$

$$\int_{20}^{30} [2r_o \sin(\pi f T)] df = (2r_o)\{[-1/\pi T\cos(\pi f T)](f=30) - [-1/\pi T\cos(\pi f T)](f=20)\} = 1.97 \tag{b}$$

It is also anticipated that the method of this Invention will improve the quality of the estimates of attenuation for gas reservoirs.

The aforementioned techniques can be implemented on conventional processing software, the bandlimited nature of the signal being the only difference from conventional processing inputs.

Noise & Signal-to-Noise Ratio

In the art of geophysical imaging, which includes the acquisition and processing of data, the primary factor limiting the quality of seismic images is that of noise. The presence of noise in the seismic data diminishes the interpretability of the image.

More noise results in substandard image quality, which can obscure the target of interest. It is therefore highly desirable to mitigate these problems by increasing the signal-to-noise ratio.

There are different types of noise, and they can be dealt with in different ways. On the processing side, noise can be reduced by algorithmic data processing. Filtering in the frequency-wave number domain can reduce ground roll. Frequency filtering can also reduce random noise, although the filter can also affect the signal.

The most powerful technique used in geophysics for cancellation of random noise is that of stacking. In this technique, reflections from a common midpoint are added together to increase the signal. Because the noise is random, it is out of phase and statistically tends to cancel when added together.

On the acquisition side, ground role or surface wave noise is suppressed by positioning the receivers so that the relative responses of the individual receivers to the surface wave energy cancel each other out. This is an example of coherent noise reduction.

In accordance with this invention, the signal-to-noise ratio is improved through utilization of the periodically repeating resonance response of the target of interest, which is determined by the target thickness and reflection coefficient ratio.

In the plot of amplitude vs. frequency, the signal-to-noise ratio is simply the ratio of the area under the curve of the signal to that of the area under the curve of the noise.

Because random noise tends to be white or flat across the spectrum, regions of the spectrum centered on resonant frequencies of the target of interest will have a higher signal-to-noise ratio than those centered on the distortion frequencies as shown in FIG. 6.

Also, regions of the spectrum centered narrowly on resonant frequencies will have a higher signal-to-noise ratio than a broadband signal, as shown in FIG. 7.

If the signal-to-noise ratio for the 10-60 Hz case is 10, then the noise level will be 0.637.

Assuming white noise, the noise level for 20-30 Hz will be 0.137, yielding a signal-to-noise ratio of 1.97/0.137=14.38.

Thus, by the method of this invention, the use of a narrowband in this example has improved the signal-to-noise ratio by about 44%.

Advantages & Benefits in Time & Investment

Some of the advantages of the selective real time bandlimited method include without limitation:

It provides an improved image without the necessity of detailed spectral decomposition analysis.

It can also be used in a marine setting.

The seismic source is controllable and frequency ranges can be tuned to the target of interest response.

Because the source takes advantage of the target of interest harmonic response, it requires less input energy to generate a satisfactory signal-to-noise ratio for imaging.

In addition to location of the source, the source signal parameters for the specific target of interest will be known and more easily repeatable, thereby permitting more accurate 4D reservoir monitoring. Repeatability of multiple bandlimited investigations will provide more information on fluid migration patterns and vastly improve accuracy.

The costs and inaccuracies associated with algorithmic processing of seismic data are reduced.

The collection method reduces or eliminates noise associated with uncontrolled sources by not collecting it. This includes signals at distortion frequencies not useful for imaging.

All publications, patents, and patent applications mentioned in this specification are herein incorporated by reference to the same extent as if each individual publication, patent, or patent application were each specifically and individually indicated to be incorporated by reference.

The descriptions given herein, and best modes of operation of the invention, are not intended to limit the scope of the invention. Many modifications, alternative constructions, and equivalents may be employed without departing from the scope and spirit of the invention. Accordingly, the scope of the invention should be limited only by the attached claims.

The invention claimed is:

1. A method of acquiring seismic data from a subsurface region that contains a target sector of interest, comprising: (A) providing (i) information about the harmonic response for the target sector of interest and (ii) a seismic source; (B) controlling the seismic source to provide seismic waves through underground geologic strata to the target sector of interest in a narrowband selected on the basis of the information about the harmonic response for the target sector of interest, wherein the seismic waves provided by the seismic source comprise waves between 10 Hz and 250 Hz; (C) activating the seismic source so as to introduce seismic waves into the subsurface sector; and (D) sensing reflections of the seismic waves at a seismic receiver.

2. The method of claim 1, wherein the information about the harmonic response for the target sector of interest is based on a peak resonant frequency of the target sector.

3. The method of claim 1, wherein the information about the harmonic response for the target sector of interest is based on resonance between reflecting surfaces of the target sector.

4. The method of claim 1, wherein the information about the harmonic response for the target sector of interest is known a priori.

5. The method of claim 1, wherein the step of controlling comprises controlling the seismic source to provide seismic waves in a frequency band substantially centered on a resonant frequency represented by the information about the harmonic response for the target sector of interest.

6. The method of claim 1, wherein the narrowband is preselected on the basis of extant information about the subsurface sector.

7. The method of claim 1, wherein a plurality of narrowbands are provided by the seismic source based on the information about the harmonic response for a plurality of different geologic targets of interest.

* * * * *